United States Patent
Rehnberg

(10) Patent No.: US 10,804,031 B2
(45) Date of Patent: Oct. 13, 2020

(54) MAGNETIC PAINT COMPOSITION AND USES THEREFOR

(71) Applicant: Margaret L Rehnberg, Algonquin, IL (US)

(72) Inventor: Margaret L Rehnberg, Algonquin, IL (US)

( * ) Notice: Subject to any disclaimer, the term of this patent is extended or adjusted under 35 U.S.C. 154(b) by 862 days.

(21) Appl. No.: 15/144,084

(22) Filed: May 2, 2016

(65) Prior Publication Data

US 2016/0322162 A1     Nov. 3, 2016

Related U.S. Application Data

(60) Provisional application No. 62/155,714, filed on May 1, 2015.

(51) Int. Cl.

| | |
|---|---|
| *H01F 41/16* | (2006.01) |
| *H01F 1/00* | (2006.01) |
| *C09D 5/23* | (2006.01) |
| *C09D 7/61* | (2018.01) |
| *C08K 3/22* | (2006.01) |
| *C08K 3/08* | (2006.01) |
| *C08K 3/26* | (2006.01) |

(52) U.S. Cl.
CPC .............. *H01F 41/16* (2013.01); *C09D 5/23* (2013.01); *C09D 7/61* (2018.01); *H01F 1/0027* (2013.01); *C08K 2003/0856* (2013.01); *C08K 2003/2206* (2013.01); *C08K 2003/265* (2013.01)

(58) Field of Classification Search
CPC ......... H01F 1/0027; H01F 41/16; C12N 1/16; C12N 9/80; C12N 1/00; F01D 5/147; F01D 21/003; F03D 13/10; F03D 1/065; F03D 1/067
See application file for complete search history.

(56) References Cited

U.S. PATENT DOCUMENTS

| | | | | |
|---|---|---|---|---|
| 5,843,329 | A * | 12/1998 | Deetz | G09F 7/04 252/62.54 |
| 6,764,732 | B2 | 7/2004 | Stefanutti et al. | |
| 2009/0315214 | A1* | 12/2009 | Heikkila | C08K 3/08 264/299 |
| 2014/0318417 | A1* | 10/2014 | Jeon | C09C 1/021 106/465 |

FOREIGN PATENT DOCUMENTS

CN      102796445 A    * 11/2012

OTHER PUBLICATIONS

Asmati98, "Instructables—Living Slime," 2014, Instructables, pp. 1-23 (Year: 2014).*
Matschei et al, "The role of calcium carbonate in cement hydration," 2007, Elsevier, vol. 37, pp. 553-558 (Year: 2007).*

* cited by examiner

*Primary Examiner* — Maria V Ewald
*Assistant Examiner* — Ethan Weydemeyer
(74) *Attorney, Agent, or Firm* — Olson & Cepuritis, Ltd.

(57) ABSTRACT

This invention relates to a magnetic paint composition for application to a substrate. Such substrate can be a wall, partition, building materials, and the like; fabric, web, paper, and the like; or other objects capable of receiving a film-forming composition which would benefit from having a magnetic or magnetizable surface.
This invention also relates to fabric, web, paper, and the like substrates coated with a magnetic film-forming composition. Such fabric, web, paper, and the like substrates may be panels of various shapes and sizes and may include an adhesive on a surface of the substrate such that the panel may be removably positioned on a surface. Preferably, the coated panel can be removed and repositioned without damaging the panel or the underlying surface.

14 Claims, No Drawings

MAGNETIC PAINT COMPOSITION AND USES THEREFOR

CROSS-REFERENCE TO RELATED APPLICATIONS

This application claims priority of U.S. Provisional Application Ser. No. 62/155,714, filed May 1, 2015, which is incorporated herein by reference.

FIELD OF THE INVENTION

This invention relates to coating compositions, specifically to magnetic or magnetizable paint compositions.

This invention also relates to substrates coated with a magnetic film-forming coating composition. Such substrates include fabric, web, paper, or other such panels.

BACKGROUND OF THE INVENTION

It is well known to removably attach magnets and magnetized objects to metallic, magnetic, magnetically permeable, or magnetizable surfaces. It has long been known to provide magnets with various indicia or decorative patterns or items attached thereto which are then magnetically adhered to a metallic, magnetic, magnetically permeable, or magnetizable surface. For example, these magnets may be placed on a metal door of a refrigerator with a piece of paper being placed between the magnet and the refrigerator door to hold a sheet of paper in a position where it can be easily viewed. In addition, such a magnet can have simply a decorative function or indicia of some sort placed there for viewing, and this is mounted magnetically to some metallic, magnetically permeable, or magnetizable surface.

If it is desired to mount magnets to a surface where there is no magnetic or magnetically permeable material, one means of accomplishing this is simply to attach a sheet of magnetically permeable metal to the surface. Then the magnet can be mounted to the magnetically permeable sheet. However, this may not always be feasible due to size, shape, texture, or other constraints of the surface. In addition, mounting a metal sheet to a surface most likely involves a nail, screw, or other such fastener which causes damage to the underlying surface.

Magnetic paint compositions are known as are ferromagnetic powders for adding to paint compositions. Many of the available magnetic paint compositions alter the tint of the paint. See WO 96/17022 at 2. Manufacturers often recommend adding ferromagnetic particles to primer rather than tinted paint. Only after application of primer with ferromagnetic particles is the tinted paint applied over the primer magnetic primer layer. This requires more steps, more time, and more coats of paint or greater quantity of ferromagnetic particles to ensure an adequate magnetic field. Another known problem with adding ferromagnetic particles to water-based paint compositions is the tendency of the ferromagnetic particles to rust.

The present invention provides a magnetic additive for film-forming materials such as paint, and the like. When the applied film-forming material dries or cures, magnetic properties are instilled to a surface coated with the material. For example, magnetic particles suspended in paint would result in paint exhibiting magnetic properties. Walls painted with magnetic paint, upon curing or drying, possess magnetic properties much like other magnetic or magnetizable surfaces.

The present composition has advantages over the prior art in that it better resists rusting, and can be added directly to premixed paint without discoloring the paint or having to apply additional coats of paint over primer with an additive to conceal it.

SUMMARY OF THE INVENTION

The present invention provides a film-forming composition which is constituted by a solidifiable liquid binder or vehicle such as paint and the like, magnetic particles distributed in the liquid binder, and calcium carbonate particles distributed in the liquid binder. When solidified, the liquid binder or vehicle provides a magnetic coating capable of holding items that include a magnet.

Powder which includes magnetic particles is combined with a liquid binder or vehicle. The composition can be conventionally and easily applied to a surface such as a wall or repositionable paper or fabric such that when applied to a substrate and dried, a surface to which magnetic objects are magnetically attracted is achieved. The composition resists rusting, does not alter the appearance of the pigment or color of conventional paints, and does not require the magnetic additive to be added to a primer and then painted over with additional coats of paint.

The film-forming composition can be applied to a variety of surfaces to create a magnetic surface such that magnets are held on to the painted surface. Such surfaces include but are not limited to: walls, tiles, floors, wooden panels, cabinet doors, fabric panels, and the like.

The present invention also provides a stable liquid paint composition of the type described which, after standing for extended periods of time, requires no more than simple stirring or agitation to place it in condition for application by brushing, rolling, spraying, or the like. The paint composition has application characteristics and film qualities appropriate for application to a wide variety of substrates and which dries and cures at room temperature.

Typically, to hang an image that is disposed on a medium requires a fixture to be embedded or otherwise affixed to a surface, for example, a nail, screw, hook or other means must be driven into a wall to display a picture, painting, photograph, or other image. Not only is the surface damaged by embedding a fixture therein, but the image must be disposed in that location unless another fixture is embedded in another location for supporting the image. The present invention provides a substrate to which the magnetized paint or liquid is applied such that the substrate is magnetically permeable. Once magnetized, the substrate can support objects magnetically adhered thereto such as the magnetic blocks disclosed in U.S. Pat. No. 8,522,464 to Rehnberg and U.S. Pat. No. 8,935,868 to Rehnberg. The substrate can be any material to which paint or a coating may be applied. Such substrates include without limitation paper, fabric, plastic, or the like. The substrate may be mounted to the wall or other surface. Preferably, the substrate is adhesive or can have an adhesive applied for mounting the substrate to another surface without the need for nails, screws, or other fasteners and without damaging the surface to which the substrate is mounted. More preferably, the adhesive allows the substrate to be removed and repositioned as desired by the user.

The present invention also provides a substrate which magnetically holds magnetizable objects to a web. The substrate is removably adhered to a surface such that it can be removed and repositioned as desired without damage to the underlying substrate.

DETAILED DESCRIPTION OF PREFERRED EMBODIMENTS

The term "magnetic" as used herein and in the appended claims means iron, cobalt, or nickel containing particles that are capable of being magnetized.

The term "magnet" as used herein and in the appended claims means a material or object that produces a magnetic field. This magnetic field is invisible but is responsible for the most notable property of a magnet: a force that pulls on other ferromagnetic materials, such as iron, and attracts or repels other magnets. "Magnet" also refers to an object with a magnet integrally attached to it such that the magnet and object may be considered a single object which retains the magnetic properties of the magnet.

The term "solidifiable liquid binder" as used herein and in the appended claims means the film-forming component of paint, varnish, finish, glue, and the like. It is the only component that must be present. Other components may be included depending on the desired properties of the cured film. Binders include synthetic or natural resins such as alkyds, acrylics, vinyl-acrylics, vinyl acetate/ethylene (VAE), polyurethanes, polyesters, melamine resins, epoxy, or oils. Binders can be categorized according to the mechanisms for drying or curing. Although drying may refer to evaporation of the solvent or thinner, it usually refers to oxidative cross-linking of the binders and is indistinguishable from curing. Some paints form by solvent evaporation only, but most rely on cross-linking processes.

The term "pigment" as used herein and in the appended claims means granular solids incorporated in the paint or binder to contribute color or visual effects such as a pearlized effect or sparkle. Fillers are granular solids incorporated to impart toughness, texture, or give the paint special properties.

The term "web" as used herein and in the appended claims refers to a strong fabric, textile, cloth, or paper. A web is woven as a flat strip or tube of varying width and fibers often used in place of rope. The name web comes from the meshed material frequently used in its construction, which resembles a web. Originally made of cotton or flax, most modern web is made of synthetic fibers such as nylon, polypropylene or polyester.

A textile or cloth is a flexible woven material consisting of a network of natural or artificial fibers.

The coefficient of friction (COF), often symbolized by the Greek letter $\mu$, is a dimensionless scalar value which describes the ratio of the force of friction between two bodies and the force pressing them together. Most dry materials in combination have friction coefficient values between 0.3 and 0.6. A value of zero would mean no friction at all, an elusive property. Rubber in contact with other surfaces can yield friction coefficients from 1 to 2. Occasionally it is maintained that $\mu$ is always <1, but this is not true. While in most relevant applications $\mu$<1, a value above 1 merely implies that the force required to slide an object along the surface is greater than the normal force of the surface on the object.

This invention relates to film-forming materials, specifically magnetic or magnetizable compositions and substrates to which a magnetic film-forming composition may be applied. Powder composed of ferromagnetic particles, and optionally calcium carbonate, is added to film-forming resin such as paint such that when applied to a substrate and dried or cured, a surface to which magnetic objects will magnetically adhere is achieved. Optionally, glue can be added to the composition to aid in dispersion and suspension of the ferromagnetic particles. Optionally, pigment or other substances or a combination of pigment and effects which impart visual effects on the resin, such as pearlized effects or sparkle, may be added. The resulting magnetic paint composition can be applied to a variety of substrates.

The weight ratio of the magnetic particles to the calcium carbonate is in the range of about 6:1 to about 1:1, preferably about 4:1.

Preferably, the magnetic particles are ferromagnetic particles of the kind available from David B. Lytle Products Inc, specifically Magically Magnetic Paint Additive (www.lyt.com). More preferably, the additive also includes calcium carbonate powder. Addition of calcium carbonate aids in preventing oxidation and rusting of the ferromagnetic particles when added to water-based paint. Most preferably, glue is also added to the paint composition. Addition of glue aids in dispersion of the particles, reduces discoloration of pigments, and reduces rusting of the ferromagnetic particles.

Preferable ratios of components for the magnetic paint composition are as follows.

EXAMPLE 1

1 part ferromagnetic particles*
3 parts paint
Apply 2-3 coats to the substrate or surface to achieve an optimal magnetic field.

EXAMPLE 2

1 part ferromagnetic particles*
2 parts glue **
1 part pigment (optional)***
Apply 1-2 coats to the substrate or surface to achieve an optimal magnetic field.

EXAMPLE 3

4 parts ferromagnetic particles*
6 parts glue**
1 part calcium carbonate powder
½ part pigment (optional)***

*Ferromagnetic particles used in the above examples are Magically Magnetic Paint Additive sold by David B. Lytle Products Inc (www.lyt.com). According to the product material data safety sheet, the powder consists of 99.0% iron (CAS Registry No. 7439-89-6) as a fine powder (OSHA PEL (TWA) 5 mg/m³).

** Glue used in the above examples is Elmers™ School Glue.

*** Pigment can be any powdered pigment in any tint or shade or any combination of pigments which tint or add visual effects to the paint composition.

The above compositions result in a magnetic film-forming composition, such as paint and the like. Optionally, pigment of a particular color or imparting visual or aesthetic effects may be added. Paint compositions may be applied to surfaces such as a wall, floor, building materials, or any other surface readily capable of receiving paint. The compositions may be applied in any manner suitable for applying paint such as with a brush, roller, or spraying. Such paint compositions may also be applied to substrates such as fabric, web, paper, and the like.

Substrates on which a magnetic paint composition can be applied include fabric, web, paper, or other such panels. Optionally, the substrate may be coated in an adhesive on one side such that the substrate can be adhered to a surface.

Preferably, the substrate may be removed and repositioned without damaging the underlying surface.

There is a magnetic force exerted by the coated substrate, via the magnetic particles in the applied coating, on a magnet or magnetic object that is held in place on the substrate. For the object to remain in place, the force of friction between the object and the substrate must be greater than the force of gravity acting on the object. Likewise, for the object to remain in place, the coefficient of friction between the object and the substrate must be greater than 1.

Preferably, the strength of the magnetic field is such that the coated substrate will remain adhered to a surface and a magnet of up to two pounds will remain magnetically attached to a vertical or inverted dried film of the composition.

Preferably, the ferromagnetic particles are of a size such that they remain in suspension for enough time to coat the surface to which the resin is applied and for the resin to cure. In addition, the particle size should be such that particle distribution within the coating provides a substantially uniform magnetic field. Particles that are too large or too fine may be difficult to suspend or disperse throughout the resin and may prevent a substantially uniform magnetic field. Particle size can be varied such that a desired appearance or texture may be imparted on the coated surface; however, too fine a particle size may result in altering the tint of any pigment of the resin and too fine or too coarse a particle size may alter the viscosity of the resin.

The particle size of the magnetic particles preferably is in the range of about 0.01 µm to about 300 µm.

The particle size of the calcium carbonate particles preferably is in the range of about 0.01 µm to about 300 µm.

The particles may also be individually encapsulated to aid in dispersion and rust inhibition.

Optionally, fabric or web panels may be used which have adhesive on one side. Such adhesive enables adhering the panel to a surface, such as a wall, and then magnetically attaching magnets or magnetic objects to the portion of the panel coated with magnetic paint composition. The entire panel or a portion thereof can be coated with the magnetic paint composition. Only the portion of the panel coated in the magnetic paint will have magnetic properties.

Preferably, the adhesive panels are such that the panels can be removed and repositioned without damaging the panel or the underlying surface. Because the panels are mounted without the use of a nail, screw, hook, or other fastener, once removed there is no visible reminder that the panel had been adhered in a particular location. Examples of such panels include Print-N-Stick panels sold by LexJet (www.lexjet.com). Preferred panels are made of terylene fabric with 5 mil gauge and are coated in a proprietary micro-encapsulated adhesive.

Fabric panels to which a magnetic film-forming resin has been applied may then be mounted such that magnets or other magnetic objects can magnetically adhere to the panels.

I claim:

1. A film-forming composition consisting of:
   a solidifiable liquid binder;
   magnetic particles distributed in the liquid binder;
   glue distributed in the liquid binder; and
   calcium carbonate particles distributed in the liquid binder, wherein when cured the composition exerts a magnetic force capable of holding a magnetic item having a mass in the range of about 4 oz to about 32 oz.

2. The film-forming composition in accordance with claim 1 wherein the magnetic particles and the calcium carbonate particles are present in a weight ratio in the range of about 6:1 to about 1:1.

3. The film-forming composition in accordance with claim 2 wherein the magnetic particles and the calcium carbonate particles are present in a weight ratio of 4:1.

4. The film-forming composition in accordance with claim 1 wherein the magnetic particles are encapsulated.

5. The film-forming composition in accordance with claim 1 additionally comprising at least one pigment.

6. The film-forming composition in accordance with claim 1 wherein the magnetic particles are ferromagnetic particles.

7. An article of manufacture capable of holding a magnetic item consisting of:
   a web; and
   a magnetic coating integral with the web;
     said magnetic coating comprising:
     a solidifiable liquid binder;
     magnetic particles distributed in the liquid binder;
     glue distributed in the liquid binder; and
     calcium carbonate particles distributed in the liquid binder;
   said magnetic coating being allowed to cure, wherein said magnetic coating exerts a magnetic force capable of holding the magnetic item when in contact with the web, and wherein the magnetic item has a mass in the range of about 4 oz to about 32 oz.

8. An article of manufacture in accordance with claim 7 wherein the magnetic coating is integral with a portion of the web.

9. The article of manufacture of claim 7 wherein the web has an adhesive on a side, opposite a side coated with the magnetic coating.

10. The article of manufacture of claim 9 wherein the web is repositionable.

11. A method of imparting magnetic properties to a web comprising the steps of:
    applying at least one coat of the magnetic film-forming composition of claim 1 to at least a portion of the web; and
    allowing the composition to cure.

12. The article of manufacture of claim 7 wherein the magnetic particles and the calcium carbonate particles are present in a weight ratio in the range of about 6:1 to about 1:1.

13. The article of manufacture of claim 12 wherein the magnetic particles and the calcium carbonate particles are present in a weight ratio of about 4:1.

14. A method of manufacturing an article of manufacture according to claim 7
    comprising applying at least one coat of a magnetic coating consisting of:
    a solidifiable liquid binder;
    magnetic particles distributed in the liquid binder;
    glue distributed in the liquid binder; and
    calcium carbonate particles distributed in the liquid binder;
    said magnetic coating being allowed to cure, wherein said magnetic coating exerts a magnetic force capable of holding a magnetic item when in contact with the web, and wherein the magnetic item has a mass in the range of about 4 oz to about 32 oz.

* * * * *